United States Patent
Mathison

[15] 3,674,791
[45] July 4, 1972

[54] BENZAMIDO 2 LOWER ALKYL DECAHYDROISOQUINOLINES

[72] Inventor: Ian William Mathison, Memphis, Tenn.
[73] Assignee: Marion Laboratories, Inc., Kansas City, Mo.
[22] Filed: March 26, 1968
[21] Appl. No.: 715,946

[52] U.S. Cl. ............... 260/287 R, 260/239.1, 260/286 R, 260/286 Q, 260/288 R, 424/258
[51] Int. Cl. ............................................................ C07d 35/38
[58] Field of Search ............................................ 260/287, 286

[56] References Cited

UNITED STATES PATENTS

| | | | |
|---|---|---|---|
| 3,317,541 | 5/1967 | Omezawa | 260/287 |
| 3,384,640 | 5/1968 | Muchowski | 260/287 X |
| 3,022,308 | 2/1962 | Cavallito | 260/286 |

OTHER PUBLICATIONS

Fuson et al., Organic Chemicstry, Wiley, p. 116–7 (1942)
Austin et al., Abstr. in Chem. Abstr. Vol. 54, Cols. 4,613– 6 (1960)
Lusinchi et al., Abstr. in Chem. Abstr. Vol. 53, Col. 21,946– 7 (1959)
Chem. Abstr. 6th Decennial Index, Vol. H– MH, p. 6411S
Okamoto et al., Abstr. in Chem. Abstr. Vol. 67, Col. 73,505 (1967)
Beeby et al., Abstr. in Chem. Abstr. Vol. 44, Col. 1,510– 11 (1950)
Mathison et al., Jour. Med. Chem. Vol. 11, pp. 997– 1,000 (1968)

*Primary Examiner*—Donald G. Daus
*Attorney*—Merriam, Marshall, Shapiro & Klose

[57] ABSTRACT

Disclosed are 5,6,7 or 8-benzamido isoquinolines, tetrahydroisoquinolines and decahydroisoquinolines, processes of producing these compounds and intermediates useful in such processes.

Some of the compounds have useful biological activity. Thus, 5-(3,4,5-trimethoxybenzamido)-2-methyl decahydroisoquinoline has antiarrhythmic activity in animals.

5 Claims, No Drawings

BENZAMIDO 2 LOWER ALKYL DECAHYDROISOQUINOLINES

This invention relates to isoquinoline derivatives. More particularly, this invention is concerned with novel 5,6,7 or 8-benzamido isoquinolines, 1,2,3,4-tetrahydro-isoquinolines and decahydroisoquinolines and processes of producing such compounds as well as intermediates used in such processes.

According to one aspect of the present invention there are provided novel 5,6,7 or 8-benzamidoisoquinolines of the formula

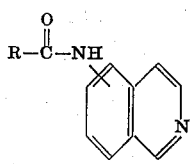

novel 5,6,6 or 8-benzamido-2-lower alkyl-1,2,3,4-tetrahydroisoquinolines of the formula

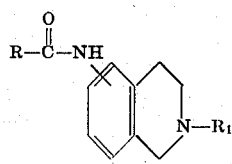

and 5,6,7 or 8-benzamido-2-lower alkyl-decahydroisoquinolines of the formula

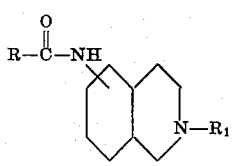

in which formulas R represents phenyl and substituted phenyl groups containing from one to three substituents such as hydroxyl, halo groups including chloro and bromo, lower alkyl groups such as methyl and ethyl, and lower alkoxy groups such as methoxy and ethoxy, and $R_1$ represents a lower alkyl group such as methyl, ethyl and propyl.

The compounds described above can be produced by reacting a substituted or unsubstituted benzoyl halide with a 5,6,7 or 8-amino isoquinoline, 2-lower alkyl-5,6,7 or 8-amino-1,2,3,4-tetrahydroisoquinoline, or 2-lower alkyl-5,6,7 or 8 - amino decahydroisoquinoline under suitable reaction conditions. These reactions can be represented as follows:

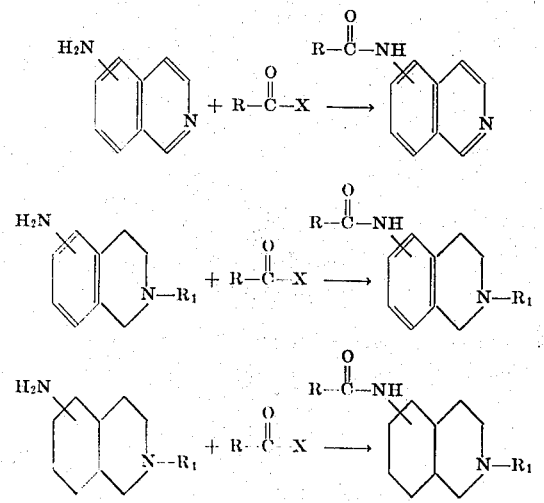

wherein R and $R_1$ have the meaning given above and X is a reactive halo group, and particularly a chloro or bromo group.

Amino-containing isoquinolines used as starting materials are disclosed in the prior art. Thus, 8-amino isoquinoline and 2-methyl-8-amino-1,2,3,4-tetrahydroisoquinoline are disclosed in Chem. Pharm. Bull. (Japan) 15 (2) 168–172 (1967). 6-aminoisoquinoline, 7-amino- isoquinoline, 2-methyl-6-amino-1,2,3,4-tetrahydroisoquinoline and 2-methyl-7-amino-1,2,3,4-tetrahydroisoquinoline are disclosed in Chem. Pharm. Bull. (Japan) 6 (5) 497–500 (1958). 2-methyl-5-amino-1,2,3,4-tetrahydroisoquinoline is disclosed in Chem. Pharm. Bull. (Japan) 9 (6) 480–484 (1961). Elderfield "Heterocyclic Compounds" Vol. IV, 411 (1952) discloses 5-aminoisoquinoline. Production of the 2-lower alkyl-5,6,7 or 8-amino decahydroisoquinolines is disclosed in copending patent application Ser. No. 636,611 filed May 8, 1967 now U.S. Pat. No. 3,459,755 which is incorporated herein by reference. Stereochemical isomers of such compounds can also be used as will be shown hereinafter.

As shown in the said application 636,611, the 2-lower alkyl-5,6,7, or 8-aminodecahydroisoquinolines are produced by catalytically reducing a 2-lower alkyl-5,6,7, or 8-nitroisoquinolinium salt to the 2-lower alkyl-5,6,7 or 8-aminodecahydroisoquinoline. This process can be represented as follows:

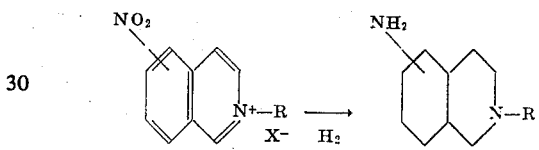

wherein R represents a lower alkyl such as methyl, ethyl and propyl, X represents an anion such as the chloride, bromide, iodide, sulfate and p-toluenesulfonate ions.

Chem. Pharm. Bull (Japan) 6, 497–500 (1958) discloses the 5,6 and 7-nitroisoquinolines and the 8-nitro compound is disclosed in Elderfield "Heterocyclic Compounds" Vol. IV, p. 410–411 (1952).

The 2-lower alkyl nitroisoquinolinium salts are readily obtained by quaternizing a 5,6,7 or 8-nitroisoquinoline with an appropriate alkylating agent such as an alkyl halide, alkyl sulfate or alkyl p-toluenesulfonate. Conventional procedures and conditions for the quaternizing can be used. Among the starting materials which can be used in the process of this invention are 2-methyl-5-nitroisoquinolinium chloride, 2-ethyl-5-nitrosioquinolinium iodide, 2-methyl-5-nitroisoquinolinium sulfate, 2-propyl-7-nitroisoquinolinium iodide and 2-methyl-5-nitroisoquinolinium p-toluenesulfonate.

In the first step of the process of this invention, the 2-lower alkyl-5,6,7, or 8-nitroisoquinolinium salt is catalytically hydrogenated directly to a 2-lower alkyl-5,6,7 or 8-aminodecahydroisoquinoline. The hydrogenation can be readily effected by use of a platinum oxide catalyst, glacial acetic acid as the hydrogenation medium together with a small amount of a strong acid, and particularly sulfuric acid, and a hydrogen pressure of about 25 to 100 psi. The hydrogenation proceeds at room temperature with the evolution of heat. The hydrogenation is substantially complete in about 48–100 hours. After filtering to remove the catalyst, and evaporating off most of the acetic acid from the filtrate, the residue can be made alkaline and the free base extracted with ether. Evaporation of the ether yields the liquid 2-lower alkyl 5,6,7 or 8-aminodecahydroisoquinoline.

Among the 2-lower alkyl-5,6,7 or 8-aminodecahydroisoquinolines which are produced by the described process are 2-methyl-5-aminodecahydroisoquinoline,
2-ethyl-5-aminodecahydroisoquinoline and
2-propyl-7-aminodecahydroisoquinoline.

The benzoyl halide reactants used in the process are also disclosed in the prior art. p-methoxybenzoyl chloride (anisoyl chloride),3,4-dimethoxybenzoyl chloride (veratryl chloride)

and 3,4,5-trimethoxybenzoylchloride (tri-o-methylgalloyl chloride) for example are disclosed in the U.S. Pat. No. 3,317,541.

The described reaction is readily effected in an organic solvent under anhydrous conditions at moderately elevated temperatures, and advisably under reflux conditions. Dry benzene and toluene are particularly suitable reaction media. After the reaction is terminated the desired product can be isolated from the reaction mixture by conventional procedures. Some of the benzamido compounds produced as described are:

5-(3,4,5-trimethoxybenzamido) isoquinoline,
6-(3,4,5-trimethoxybenzamido)-2-methyl-1,2,3,4-tetrahydroisoquinoline,
7-(3,4,5-trimethoxybenzamido)-2-methyl-decahydroisoquinoline,
5-benzamido isoquinoline,
6-(4-ethoxybenzamido) isoquinoline,
8-benzamido isoquinoline, and
5-(3,4,5-trimethylbenzamido) decahydroisoquinoline as well as stereochemical isomers thereof.

As a further aspect of this invention there is provided a method of producing cis-5,9,10-H-5-amino-2-lower alkyl decahydroisoquinoline and trans-9,10-t-5-H-5-amino-2-lower alkyl decahydroisoquinoline from the corresponding 5-amino-2-lower alkyl decahydroisoquinoline and intermediates useful in such process.

As a first step in producing the described cis and trans isomers, 5-amino-2-lower alkyl decahydroisoquinoline is reacted with an acetylating agent to produce 5-acetamido-2-lower alkyl decahydroisoquinoline. Acetic anhydride, as well as other acetylating agents, can be used. The reaction is readily effected in an anhydrous liquid reaction medium, such as dimethylformamide or benzene, at ambient temperature. After the reaction is terminated the solvent can be removed and the 5-acetamido-2-lower alkyl decahydroisoquinoline dissolved in water. The cis-5,9,10-H-5-acetamido-2-lower alkyl decahydroisoquinoline crystallizes from solution and is separated such as by filtration. The trans-9,10-t-5-H-5-acetamido-2-lower alkyl decahydroisoquinoline remains dissolved in water. It can be isolated such as by evaporating the filtrate to dryness, or by extracting with ether and evaporating the ether extract to dryness.

The described process is particularly suitable for separating 5-acetamido-2-methyl decahydroisoquinoline into cis-5,9,10-H-5-acetamido-2-methyldecahydroisoquinoline and trans-9,10-t-5-H-5-acetamido-2-methyldecahydroisoquinoline.

Each of the separated cis and trans acetamido isomers upon hydrolysis yields the corresponding cis-5,9,10-H-5-amino-2-lower alkyl decahydroisoquinoline and trans-9,10t-5-H-5-amino-2-lower alkyl decahydroisoquinoline. The hydrolysis is readily effected in aqueous acid solution under reflux conditions. A mineral acid such as sulfuric acid or hydrochloric acid can be used as well as other acids suitable for hydrolysis purposes. After the hydrolysis is terminated the desired product can be recovered from the reaction mixture by conventional methods.

Representative of the stereochemical isomers which are produced in this way are cis-5,9,10-H-5-amino-2-methyl decahydroisoquinoline from cis-5,9,10-H-5-acetamido-2-methyl decahydroisoquinonline, and trans-9,10-t-5-H-5-amino-2-methyl decahydroisoquinoline from trans-9,10-t-5-H-5-acetamido-2-methyl decahydroisoquinoline.

The separated cis and trans-5-amino-2-lower alkyl decahydroisoquinolines can be reacted with a benzoyl halide as previously described to produce the corresponding cis and trans amido isomers. Thus, cis-5,9,10-H-5-amino-2-methyl decahydroisoquinoline can be reacted with 3,4,5-trimethoxybenzoyl chloride to produce cis-5,9,10-H-5-(3,4,5-trimethoxybenzamido)-2-methyl decahydroisoquinoline, and trans-9,10-t-5-H-5-amino-2-methyl decahydroisoquinoline can be reacted with 3,4,5-trimethoxybenzoyl chloride to give trans-9,10-t-5-H-5-(3,4,5-trimethoxybenzamido)-2-methyl decahydroisoquinoline.

Acid addition salts of the bases of this invention are produced by contacting the compounds with an organic or inorganic acid such as hydrochloric, sulfuric, formic, citric, maleic, succinic and fumaric acids.

Quaternary ammonium salts are formed by contacting the tertiary amines with a suitable alkylating agent such as dimethyl sulfate or an alkyl halide such as methyl chloride and ethyl bromide.

The compounds of this invention, being amines, have use as neutralizing agents. In addition, the compounds may be used in the isolation and purification of penicillin with which they will form salts.

The compounds of this invention also possess biological activity in animals and thus are potentially useful as drugs. They can be used as biologically active standards in evaluating other compounds for similar activity in animals.

In general, the compounds lower blood pressure when administered intravenously to animals although the dosage required can vary from compound to compound as can the extent of the reduction and the time it will be sustained.

5-(3,4,5-trimethoxybenzamido)isoquinoline had an LD–50 of about 250–500 mg/kg in mice when administered intraperitoneally. This compound lowered mean arterial blood pressure in two dogs at 5 mg/kg intravenously. The blood pressure response was immediate in onset although not sustained.

5-(3,4,5-trimethoxybenzamido)-2-methyl-1,2,3,4-tetrahydroisoquinoline in mice has an LD–50 of about 125 to 250 mg/kg intraperitoneally. In the anesthetized dog, it decreased arterial blood pressure at a test dose of 5 mg/kg administered intravenously. When administered into the femoral artery of a dog it was found to have peripheral vasodilator activity although less than that of papaverine.

Cis-5,9,10-H-5-(3,4,5-trimethoxybenzamido)-2-methyl decahydroisoquinoline has an LD-50 of 285 mg/kg administered intraperitoneally to mice. It has an ED–50 of 80 mg/kg when used to pretreat mice intraperitoneally against the development of ventricular fibrillation by chloroform (Pharmacologist 1: No. 2,75 (1959) and thus has antiarrhythmic activity. It has a therapeutic index (LD–50/ED–50) of 3.6 which is significantly greater than the lower value of 3.0 for quinidine.

Trans-9,10-t-5-H-5-(3,4,5-trimethoxybenzamido)-2-methyl decahydroisoquinoline has an LD–50 intraperitoneally administered to mice of 288 mg/kg. It is an active antiarrhythmic agent in mice. Four groups of mice, each consisting of 10 or more animals per group, were administered 40,50,63 and 79 mg/kg by the intraperitoneal route. Aqueous solutions were prepared by dissolving the compound in 1 N HCl and back-titrating with NaOH. The animals were then observed for protection against ventricular fibrillation induced by chloroform. The ED–50 was calculated to be 60 mg/kg. An antiarrhythmic therapeutic index of 4.6 was calculated.

5-acetamido isoquinoline in the anesthetized dog had peripheral vasodilator activity when administered intra-arterially at 1 and 2 mg.

5-acetamido-2-methyl-1,2,3,4-tetrahydroisoquinoline administered 1 mg intra-arterially to the anesthetized dog was found to have peripheral vasodilator activity.

The active agents of this invention can be administered to animals as pure compounds. It is advisable, however, to first combine one or more of the compounds with a suitable pharmaceutical carrier to attain a satisfactory size to dose relationship.

Pharmaceutical carriers which are liquid or solid can be used. Solid carriers such as starch, sugar, talc and the like can be used to form powders. The powders can be used for direct administration or they may be used to make tablets or fill gelatin capsules. Suitable lubricants like magnesium stearate, binders such as gelatin, and disintegrating agents like sodium carbonate in combination with citric acid can be used to form tablets.

Unit dosage forms such as tablets and capsules can contain any suitable predetermined amount of one or more of the active agents, and may be administered one or more at a time at regular intervals. Such unit dosage forms, however, should generally contain a concentration of 0.1 to 50 percent by weight of one or more of the active compounds. Unit dosages, such as tablets and capsules, can contain about 0.02 to 300 mg of active agent.

A typical tablet can have the composition:

|  | Mg |
|---|---|
| 5-(3,4,5-trimethoxybenzamido)-2-methyl decahydroisoquinoline | 20 |
| Starch, U.S.P. | 57 |
| Lactose, U.S.P. | 73 |
| Talc, U.S.P. | 9 |
| Stearic acid | 6 |

Since many of the free bases are insoluble in water they can be suspended in sterile water by suitable means such as colloidal gums and the like to prevent settling and thereby assure uniform drug concentration per dose.

Although the oral route of administration is preferred intravenous injection is also suitable.

The following examples are presented to illustrate the invention.

EXAMPLE 1

5-Amino-2-Methyl Decahydroisoquinoline

5-Nitro-2-methylisoquinolinium p-toluenesulfonate (25 g) was dissolved in glacial acetic acid (150 ml), conc. $H_2SO_4$ (0.6 ml) added and the mixture hydrogenated over platinum oxide (4g) at 50 psi. In 25 minutes the color changed from yellow-brown to colorless, and the rate of hydrogen uptake dropped markedly. During this state the temperature rose to approximately 60°–70° C. After 120 hr., the uptake of hydrogen was very slow though only 90–95 percent of the theoretical amount had been absorbed. After removal, in vacuo, of most of the acetic acid, the residue was made alkaline with aqueous base and the free amine extracted with ether. The weight of recovered material after removal of the ether was 95 per cent of the calculated amount based on 5-amino-2-methyl-decahydroisoquinoline. The 5-amino-2-methyl-decahydroisosquinoline isomeric mixture distilled at 50°–57° C. at 0.2mm. Exposure of this amine to air causes rapid formation of solid carbonate.

EXAMPLE 2

Cis-5,9,10-H-5-Acetamido-2-Methyl Decahydroisoquinoline and trans-9,10-t-5-H-5-Acetamido-2-Methyl Decahydroisoquinoline Freshly distilled 5-amino-2-methyldecahydroisoquinoline (29.7 g) was dissolved in dried, distilled dimethylformamide (240 ml). To this solution, cooled to 0° C. was added acetic anhydride (18.0 g) in benzene (75 ml) during 1.5 hr. The mixture was allowed to warm and stand at room temperature overnight. The benzene and dimethylformamide were removed at reduced pressure by rotary evaporation. The residue was dissolved in water (55 ml), cooled, and made basic. Scratching and stirring caused the insoluble viscous oil to crystallize. The crystalline product was collected by filtration, washed with cold water, and allowed to dry over $CaCl_2$ in a vacuum desiccator, weight 16.0 g;mp 163°–5° C. When recrystallized from ethanol (30 ml) and water (60 ml), and dried, 12.3 grams of cis-5,9,10-H-5-acetamido-2-methyl decahydroisoquinoline was obtained; mp 168°–9° C. An analytical sample melted at 169°–170° C.

Anal. Calcd. for $C_{12}H_{22}N_2O$: C, 68.52; H, 10.55; N, 13.32.
Found: C, 68.69; H, 10.65; N, 13.00.

The basic filtrate was extracted with eight 100-ml portions of ether. The ether solution was dried over sodium sulfate overnight. A light precipitate was decanted and collected by filtration to yield 1.0 g of trans-9,10-t-5-H-5-acetamido-2-methyl decahydroisoquinoline; mp 199.3°–200.3° C. The filtrate was concentrated to a residue of 9.4 g which was recrystallized from ethyl acetate-benzene several times to yield 1.0 g of product; mp 197.3°–198.3° C. The basic, aqueous solution (after ether extraction) was then concentrated to a slightly tacky solid. This solid was extracted four times with ethyl acetate to yield 4.7 g of solid when dry. Two recrystallizations from ethyl acetate-benzene afforded 2.5 grams of white crystals of analytical trans-9,10-t-5-H-5-acetamido-2-methyl decahydroisoquinoline; mp 199.5°–200.5° C. Further work-up of the various mother liquors provided more product.

Anal. Calcd. for $C_{12}H_{22}N_2O$: C, 68.52; H, 10.55; N, 13.32.
Found: C, 68.48; H, 10.50; N, 13.20.

EXAMPLE 3

Hydrolysis of cis-5,9,10-H-5-acetamido-2-methyl decahydroisoquinoline to cis-5,9,10-H-5-amino-2-methyl decahydroisoquinoline.

A solution of cis-5,9,10-H-5-acetamido-2-methyl-decahydroisoquinoline (8.0 g) and concentrated sulfuric acid (8 ml) in water (100 ml) was refluxed 20 hr. The acid solution was concentrated in vacuo to a small volume and made basic with sodium hydroxide pellets. The basic solution was extracted with ether. The ether solution was dried over potassium carbonate and concentrated to yield 6.14 g of cis-5,9,10-H-5-amino-2-methyl decahydroisoquinoline as a straw-colored oil. A dipicrate of the amine melted at 237.8°–238.8° C.

Anal. Calcd. for $C_{22}H_{26}N_8O_{14}$: C, 42.17; H, 4.18; N, 17.89.
Found: C, 42.24; H, 4.30; N, 18.11.

EXAMPLE 4

Hydrolysis of trans-9,10-t-5-H-5-acetamido-2-methyl deca-hydroisoquinoline to trans-9,10-t-5-H-5-amino-2-methyl decahydroisoquinoline A solution of trans-9,10-t-5-H-5-acetamido methyl decahydroisoquinoline (8.7 g) and concentrated sulfuric acid (22 ml) in water (200 ml) was refluxed for 144 hr. The solution was concentrated and made alkaline with sodium hydroxide pellets, extracted with ether, dried over potassium carbonate and concentrated to yield 6.3 g of trans-9,10-t-5-H-5-amino-2-methyl decahydroisoquinonline as an oily product. A vapor phase chromatogram showed a single component having the same retention time as the smaller peak for the chromatogram of the mixture produced from the hydrogenation of 5-nitro-2-methylisoquinolinium p-toluenesulfonate. A dipicrate of the amine melted at 261.8°–263.8° C.

Anal. Calcd. for $C_{22}H_{26}N_8O_{14}$: C, 42.17; H, 4.18; N, 17.89.
Found: C, 42.23; H, 4.34; N, 17.90.

EXAMPLE 5

Cis-5,9,10-H-5-(3,4,5-Trimethoxybenzamido)-2-methyl decahydroisoquinoline

A solution of cis-5,9,10-H-5-acetamido-2-methyl decahydroisoquinoline (8.0 g) and concentrated sulfuric acid (8.0 ml) in water (100.0 ml) was refluxed 24 hr. The solution was concentrated, made basic with sodium hydroxide and extracted with ether. The ether solution was dried over sodium sulfate and concentrated to yield 6.16 g of cis-5,9,10-H-5-amino-2-methyl decahydroisoquinoline. A solution of this amine (3.0 g) in anhydrous benzene and 3,4,5-trimethoxybenzoyl chloride (5.0 g) in anhydrous benzene was refluxed 24 hr. with the addition of anhydrous potassium bicarbonate (1.0 g). The crystalline product was collected by filtration and then recrystallized from ethanol to yield 5.90 g, mp 218.0°–218.5° C. Examination of the IR spectra of this amide showed it to be consistent with the proposed structure. An analytical sample melted at 218.0°–218.5° C.
Anal. Calcd. for $C_{20}H_{30}N_2O_4$: C, 66.27; H, 8.43; N, 7.73.
Found: C, 65.98; H, 8.52; N, 7.96.

EXAMPLE 6

Trans-9,10-t-5-H-5-(3,4,5-Trimethoxybenzamide)-2-methyl decahydroisoquinoline

A solution of trans-9,10-t-5-H-5-acetamido-2methyl decahydroisoquinoline (3.0 g) and concentrated sulfuric acid (7.6 ml) in water (70.0 ml) was refluxed 144 hr. The solution was concentrated, made basic with sodium hydroxide, and extracted with ether. The ether solution was dried over sodium sulfate and concentrated to yield 2.0 g of trans-9,10-t-5-H-5-amino-2-methyl decahydroisoquinoline. A solution of this amine (2.0 g) in anhydrous benzene was treated with 3,4,5-trimethoxybenzoyl chloride (3.5 g) as described in Example 5 for the cis isomer. The precipitated amide was isolated similarly and recrystallized from ethanol-ether to yield 2.5 g of trans-9,10-t-5H-5-(3,4,5-trimethoxybenzamido)-2methyl decahydro-isoquinoline: mp 217.0°–219.0° C. The IR spectra of this amide was consistent with the proposed structure. An analytical sample melted at 217.0°–219.0° C. Mixture melting point of the compound with the cis-5,9,10-H-isomer was 194°–204° C.
Anal. Calcd. for $C_{20}H_{30}N_2O_4$: C, 66.27; H, 8.34; N, 7.73.
Found: C, 66.06; H, 8.34; N, 7.65.

EXAMPLE 7

5-(3,4,5-Trimethoxybenzamido)-2-methyl-1,2,3,4tetrahydroisoquinoline 5-amino-2-methyl-1,2,3,4-tetrahydroisoquinoline (3.76 g) was dissolved in anhydrous benzene (100 ml) and treated with 3,4,5-trimethoxybenzoyl chloride (5 g) under reflux for 16 hours in the presence of 0.25 g of anhydrous potassium bicarbonate. The precipitated solid was filtered and washed with sodium carbonate solution. The solid was recrystallized from benzene to yield 4.04 g of fine needles; mp 142.8°–143.1° C.
Anal. Calcd. for $C_{20}H_{24}N_2O_4$: C, 67.40; H, 6.79; N, 7.86.
Found: C, 67.24; H, 6.64; N, 7.76.

EXAMPLE 8

5-(3,4,5-Trimethoxybenzamido)-isoquinoline 5-aminoisoquinoline (4g) and 3,4,5-trimethoxy-benzoyl chloride were refluxed in dry benzene (100 ml) in the presence of potassium bicarbonate (0.25 g) for 3 days. The precipitated solid was filtered and treated with sodium carbonate solution. The insoluble material was refiltered, dried, and crystallized from ethanol to yield 1.5 g of white crystals; mp 201.2°–202.8° C.
Anal. Calcd. for $C_{19}H_{18}N_2O_4$: C, 67.44; H, 5.36; N, 8.28.
Found: C, 67.28; H, 5.29; N, 8.47.

EXAMPLE 9

5-Acetamido-2-methyl-1,2,3,4-tetrahydroisoquionline 5-amino-2-methyl–Amino–tetrahydroisoquinoline (6.5 g) was dissolved in dry benzene (50 ml) and treated with acetyl chloride (8g) and refluxed in the presence of potassium carbonate (0.5 g) for 4 hours. The resulting solution was filtered and the benzene filtrate evaporated to dryness. The resulting solid (hygroscopic) was dissolved in water, made alkaline and the separated solid filtered and recrystallized from benzene to yield 9.0 of fine needles; mp 137.5°–138.1° C.
Anal. Calcd. for $C_{12}H_{16}N_2O$: C, 70.55; H, 7.90; N, 13.71.
Found: C, 70.11; H, 7.97; N, 13.49.

EXAMPLE 10

5-Acetamidoisoquinoline 5-aminoisoquinoline (3.6 g) was dissolved in glacial acetic acid (100 ml) and acetic anhydride (3.6 g) added and the mixture refluxed for 1.5 hours. The cooled solution was made alkaline with ammonium hydroxide. The resulting gel was warmed to dissolve the precipitated amide and then cooled in an ice bath to yield 3.2 g of solid; mp 165.5°–167° C.

The foregoing detailed description has been given for clearness of understanding only, and no unnecessary limitations should be understood therefrom as modifications will be obvious to those skilled in the art.

What is claimed:
1. 5-(3,4,5-trimethoxybenzamido)-2-lower alkyl decahydroisoquinoline.
2. A compound according to claim 1 in which the lower alkyl is methyl.
3. A compound of the formula

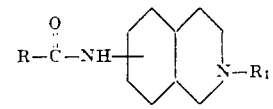

wherein R is phenyl having one to three hydroxyl, halo, methyl, ethyl or lower alkoxy groups and $R_1$ is lower alkyl, and nontoxic pharmaceutically acceptable acid addition salts and nontoxic lower alkyl quaternary ammonium salts thereof.
4. Compounds according to claim 3 in which R is 3, 4, 5-trimethoxyphenyl.
5. Trans -9,10-t-5-H-5-(3,4,5-trimethoxybenzamido)-2-methyl decahydroisoquinoline.

* * * * *

PO-1050
(5/69)

UNITED STATES PATENT OFFICE
CERTIFICATE OF CORRECTION

Patent No. 3,674,791     Dated July 4, 1972

Inventor(s) Ian William Mathison, Ph.D.

It is certified that error appears in the above-identified patent and that said Letters Patent are hereby corrected as shown below:

In the title, insert -- Nuclear Substituted -- before "Benzamido"; column 1, line 20, change "5, 6, 6" to -- 5, 6, 7 -- column 3, line 41, before "water" insert -- the --; column 7, line 5, change "8.43" to -- 8.34 --, line 10, change "benzamide" to -- benzamido --; column 8, line 12, delete "Amino" and insert -- 1, 2, 3, 4 --.

Signed and sealed this 2nd day of January 1973.

(SEAL)
Attest:

EDWARD M. FLETCHER, JR.                ROBERT GOTTSCHALK
Attesting Officer                      Commissioner of Patent